(12) United States Patent
Cope et al.

(10) Patent No.: US 11,820,515 B2
(45) Date of Patent: Nov. 21, 2023

(54) REST MAT

(71) Applicant: Bubba Board, Ltd., London (GB)

(72) Inventors: Alexis Cope, London (GB); Jeffrey Cope, London (GB)

(73) Assignee: Bubba Board, Ltd., London (GB)

( * ) Notice: Subject to any disclaimer, the term of this patent is extended or adjusted under 35 U.S.C. 154(b) by 122 days.

(21) Appl. No.: 17/517,476

(22) Filed: Nov. 2, 2021

(65) Prior Publication Data
US 2022/0135231 A1 May 5, 2022

(30) Foreign Application Priority Data

Nov. 3, 2020 (GB) ...................................... 2017389

(51) Int. Cl.
*B64D 11/06* (2006.01)
(52) U.S. Cl.
CPC ...... *B64D 11/0638* (2014.12); *B64D 11/0612* (2014.12)
(58) Field of Classification Search
CPC .............. B64D 11/0612; B60N 2/2854; B60N 2/2833; B60N 2/6009
See application file for complete search history.

(56) References Cited

U.S. PATENT DOCUMENTS 2,601,488 A * 6/1952 Allen ..................... B60N 2/345
5/94
2,688,998 A * 9/1954 Erickson ................ B61D 31/00
5/118
6,327,726 B1 * 12/2001 Weber .................... A47D 5/006
5/118

(Continued)

FOREIGN PATENT DOCUMENTS

AU       2019100300 A     5/2019
ES        1199308 U     11/2017

(Continued)

OTHER PUBLICATIONS

GB2017389.4—Patents Act 1977: Search Report Under Section 17, dated Apr. 14, 2021.

*Primary Examiner* — Christopher D Hutchens
(74) *Attorney, Agent, or Firm* — FisherBroyles, LLP; Adam K. Whiting

(57) ABSTRACT

There is disclosed a rest mat (100) for use in a vehicle. The mat comprises a first mat portion (102), a second mat portion (104), and a third mat portion (106). The mat (100) has a first configuration in which the mat (100) is configured for storage or transport, and a second configuration in which the mat is deployed for use. The first mat portion (102), the second mat portion (104) and the third mat portion (106) are arranged so that, when the mat (100) is in its second configuration, the first mat portion (100) is arranged to at least partially overlay a seat portion (114) of a chair (112) of the vehicle, the second mat portion (104) is arranged to project outwardly over a front edge of the seat portion (114) and form an extended area (105) together with the first mat portion (102) to accommodate a child. The third mat portion (106) is arranged to attach to a seat-back pocket (116) or tray-table (132) of a chair (110) in front of the mat (100) so as to provide support to the second mat portion (104).

19 Claims, 7 Drawing Sheets

(56) References Cited

U.S. PATENT DOCUMENTS

| | | | | |
|---|---|---|---|---|
| 6,561,588 B1 * | 5/2003 | Brady | ................ | B60N 2/6009 |
| | | | | 297/188.2 |
| 10,166,902 B2 * | 1/2019 | Cayzer | ................ | B60N 2/995 |
| 2008/0290707 A1 * | 11/2008 | Schramek-Flye | ...... | A47D 1/103 |
| | | | | 297/255 |
| 2017/0217346 A1 | 8/2017 | Knapp | | |
| 2018/0055239 A1 * | 3/2018 | O'Doherty | ............... | A47D 7/04 |

FOREIGN PATENT DOCUMENTS

| | | | |
|---|---|---|---|
| FR | 2293340 A | | 7/1976 |
| WO | 2016012869 A | | 1/2016 |
| WO | 2021009544 A | | 1/2021 |

* cited by examiner

REST MAT

FIELD

The present disclosure relates to a rest mat. More particularly the present disclosure relates to a child or baby's rest mat for use in a vehicle.

BACKGROUND

Traveling long distances in a vehicle, such as a train or airplane, can be tiring and uncomfortable for young children and babies. Often, a vehicle's seats are too small to let the child or baby rest or sleep comfortably.

The present invention has been devised with these problems in mind.

SUMMARY

According to a first aspect there is disclosed a rest mat for use in a vehicle, comprising: a first mat portion, a second mat portion, and a third mat portion; the mat having a first configuration in which the mat is configured for storage or transport, and a second configuration in which the mat is deployed for use; and the first mat portion, the second mat portion and the third mat portion arranged so that, when the mat is in its second configuration, the first mat portion is arranged to at least partially overlay a seat portion of a chair of the vehicle, the second mat portion is arranged to project outwardly over a front edge of the seat portion and form an extended area together with the first mat portion to accommodate a child, and the third mat portion is arranged to attach to a seat-back pocket or tray-table of a chair in front of the mat so as to provide support to the second mat portion.

According to some examples, the first mat portion comprises a pocket portion, the second mat portion being arranged to slide in and out of the pocket portion.

According to some examples, the second mat portion is arranged to slide completely out of the first mat portion, so as to enable separation of the first mat portion from the second mat portion.

According to some examples, the mat comprises a connecting portion between the second mat portion and the third mat portion, the connecting portion constructed and arranged to enable the third mat portion to articulate relative to the second mat portion.

According to some examples, the connecting portion is constructed and arranged to enable the third mat portion to tilt downwardly or upwardly when the mat is in its second configuration.

According to some examples, the mat comprises two or more third portions, each of the two or more third portions being of a different length.

According to some examples, each of the two or more third portions are stacked above each other.

According to some examples, the mat comprises an attachment device for attaching the mat to the seat-back pocket or tray table.

According to some examples, the attachment device is attached to the second mat portion.

According to some examples, the attachment device comprises an adjustable strap.

According to some examples, the attachment device is arranged to form a carry-handle or carry-strap for carrying the mat when the mat is in its first configuration.

According to some examples, the mat comprises an end flap that extends from the first mat portion in a direction opposite from the second mat portion, the end flap arranged to secure the mat to the chair.

According to some examples, the end flap comprises an elongate portion that extends across a width of the end flap.

According to some examples, the mat comprises one or more side flaps that extend from respective sides of the first mat portion, the one or more side flaps arranged to secure the mat to the chair.

According to some examples, when in its second configuration an overall length of the rest mat is in a range of about 100 cm to about 117 cm.

According to some examples, a width of the mat is in a range of about 34.5 cm to about 40 cm.

According to some examples, dimensions of the first mat portion being about 44 cm in length by about 40 cm in width; dimensions of the second mat portion being about 23.5 cm in length by about 40 cm in width, dimensions of the third mat portion being about 24 cm in length by about 30 cm in width; dimensions of the end flap being about 34 cm in length by 40 cm in width.

According to some examples, one or more of the first mat portion, the second mat portion, and the third mat portion comprising a foam material.

According to some examples, one or more of first mat portion, second mat portion, and third mat portion comprise a durable, wipe-clean cover or coating.

According to some examples, the vehicle comprises an airplane.

BRIEF DESCRIPTION OF DRAWINGS

The invention will be described in more detail with respect to the accompanying Figures in which.

DETAILED DESCRIPTION

Figure 1:
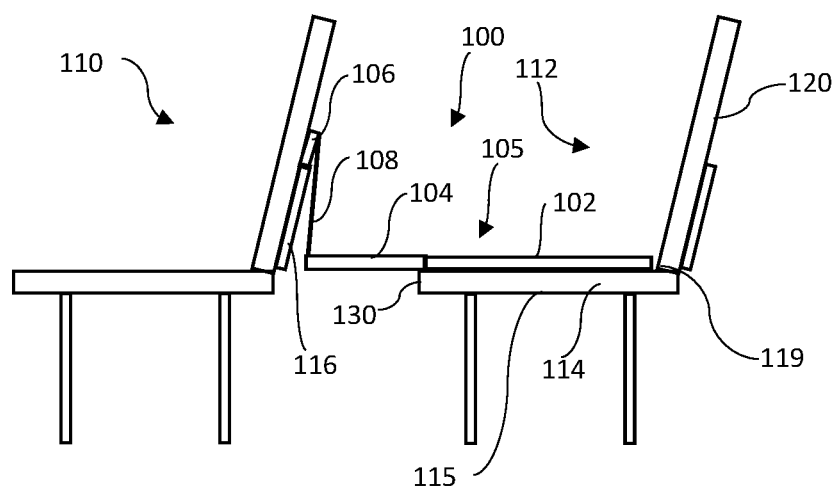
FIG. 1 schematically shows a rest mat attached to a vehicle seat according to an example.

According to some examples there is provided a child or baby rest mat 100, 200 for use in a vehicle. The mat 100, 200 may also be referred to as a sleep mat. That is the mat 100, 200 is suitable for resting and/or sleeping on. The rest mat 100, 200 may also be referred to simply as a mat. For conciseness, and unless otherwise indicated, the term "child" encompasses children, babies, toddlers etc. The invention may have particular utility for young children, for example children under the age of 5. The vehicle may for example be an airplane, a train, or a bus. Some examples of the invention have particular utility in airplanes. Examples may also be utilized in other vehicles such as cars when stationary.

A first example embodiment will now be described with respect to FIGS. 1 to 4.

The mat 100 has a first mat portion 102, a second mat portion 104 and a thirdmat portion 106.

In examples, the mat 100 has a first configuration in which the mat 100 is configured for storage or transport. This will be explained in more detail further below with respect to FIG. 4.

The mat has a second configuration in which the mat 100 is deployed for use. This is shown in more detail with respect to FIGS. 1 and 2. When in its second configuration, the first mat portion 102 is arranged to overlie or at least partially overlie a seat portion 114 of a chair 112 of a vehicle. The second mat portion 104 is arranged to project outwardly over a front edge 130 of the seat portion 114. The second mat portion 104 therefore forms an extended area 105 to accommodate the child. For example, the extended area 105 may be used by a child for lying down or extending their legs out fully. The extended area 105 may be used by a child for resting or sleeping. When the mat 100 is in its second configuration, the third matportion 106 is arranged to attach to a seat-back pocket 116 (FIG. 1) or to a traytable 132 or part of a tray table 132 (FIG. 2). The seat-back pocket 116 and the tray-table 132 are attached to a chair 110 that is in front of chair 112. In examples it may be considered that chair 110 is a chair immediately in front of chair 112. By attaching third mat portion 106 to seat-back pocket 116 or tray-table 132, support is provided to the second mat portion 104. Therefore, the second mat portion 104 can support the weight of a child or part of a child that is resting on second mat portion 104.

Thus, it will be understood that according to examples there is provided a mathaving three portions, in which the first and second portions are arranged to lie in a same plane or substantially a same plane when deployed. When deployed, the thirdmat portion is arranged to tilt upwardly or downwardly from the plane shared by the first and second portions. This enables the third mat portion to form an "anchor" or support with respect to a feature of a vehicle chair. For example, the third mat portion may be arranged to slide into a seat back pocket of a chair in front of the mat, or attach to a tray table of the chair in front of the mat, so as to provide the support function. The first, second and third mat portions may also be configured into a compact arrangement for storage or transport.

According to some examples, the mat 100 comprises a connecting portion 108 between the second mat portion 104 and the third mat portion 106. In some examples, the connecting portion 108 enables articulation between the second mat portion 104 and the third mat portion 106. For example, the connecting portion 108 may enable the third mat portion 106 to tilt relative to the second mat portion 104.

Figure 2:
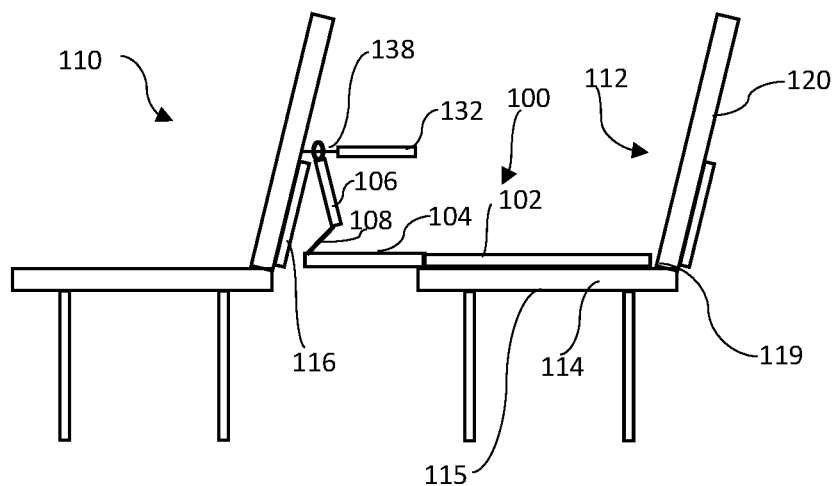
FIG. 2 schematically shows a rest mat attached to a vehicle seat according to an example.

In some examples, and as shown in FIG. 1, the connecting portion 108 enables the third mat portion 106 to tilt downwardly into the seat-back pocket 116. In FIG. 1, a part of third mat portion 106 is obscured due to its placement in seat-back pocket 116.

In some examples, and as shown in FIG. 2, the connecting portion 108 enables the third mat portion 106 to tilt upwardly towards tray table 132.

Therefore, in some examples, it may be considered that the third mat portion 106 acts as an anchor for supporting second mat portion 104.

According to some examples, a length of the connecting portion 108 is adjustable. In some examples, length adjustment of connection portion 108 is by means of snaps or popper buttons shown schematically at 107 and 109 in FIG. 3B. Adjustment may also be possible in other ways. For example, connecting portion 108 can be folded and unfolded in order to adjust its length. In some examples, the length of the connecting portion 108 is adjustable by one or more straps. For example, the one or more straps may comprise an adjuster buckle or ring or the like, to enable the one or more straps to be shortened or lengthened. In some examples, the one or more straps comprise a Velcro® or snap fastener. For example, the straps may be pulled through a buckle or the like by a desired amount and then fastened with the Velcro® or snap fastener.

In some examples, the connecting portion 108 comprises an elastic material. For example, the connecting portion 108 may comprise Lycra®, elastane, spandex etc.

In some examples, the connecting portion 108 is not adjustable in length. In some examples the connecting portion 108 is relatively short. For example, the connecting portion 108 may be of a length that is required for the purpose of forming a joint. For example, the connecting portion may consist of a narrow piece of material between the second portion 104 and the third portion 106. See for example FIGS. 5A and 5B for further discussion.

In some examples, the second mat portion 104 comprises one or more fasteners 134, 136, for fastening the second mat portion 104 to the pocket 116 or tray-table 132. In some examples the one or more fasteners 134, 136 comprises one or more loops or hooks. In some examples the one or more fasteners 134, 136 are made of a flexible material, such as fabric. In some examples, the one or more fasteners 134, 136 comprise a snap connection so that the fasteners 134, 136 can be securely fastened. For example, the snap connection may comprise a press-stud. As shown in FIG. 2, the one or more fasteners 134, 136 may be used for fastening the third mat portion 106 to the tray-table 132 when the tray-table 132 is in a lowered position. Where it is said that the third mat portion 106 is attached to the tray-table it will be understood that this can mean the table itself or a portion of the table which attaches to chair 110. For example, the fasteners 134, 136 may fasten around linkages 138 which attach table 132 to chair 110. In some examples, the fasteners 134, 136 are not provided.

In some examples, the connecting portion 108 is separable from second portion 104. For example, an attachment device 111 such as one or more snaps or poppers, represented schematically in FIG. 3B, may connect second portion 104 to connecting portion 108. For example, the snaps or poppers may comprise one or more press studs. The attachment device 111 enables second portion 104 and connecting portion 108 to be detached quickly. For example, the attachment 111 enables the connecting portion 108 to be disassembled from second portion 104 quickly if ever needed in an emergency or when a seat-belt light is illuminated, for example.

According to some examples, the mat 100 comprises a flap 118. Flap 118 is located at an end 121 of first mat portion 102. It will be understood that some embodiments may omit flap 118. Flap 118 is arranged so that when the mat 100 is in its deployed configuration the flap 118 extends from the first mat portion 102 in a direction opposite from the second mat portion 104. The flap 118 is arranged to secure the mat 100 to the chair 112. For example, in use, the flap 118 is arranged to be inserted between seat portion 114 and seat-back 120 of chair 112, i.e., into gap 119 shown in FIGS. 1 and 2.

According to some examples, the mat 100 comprises one or more further flaps or the like for securing the mat 100 to chair 112. For example, and as shown schematically in FIG. 3B, mat 100 may comprise one or more side flaps 117, 127. The flaps 117, 127 are located along respective sides 123, 125 of the first mat portion 102. For example, side flaps 117, 127 may be inserted into a respective side 115 of the chair 112 (e.g., under seat cushion).

Figure 3A:
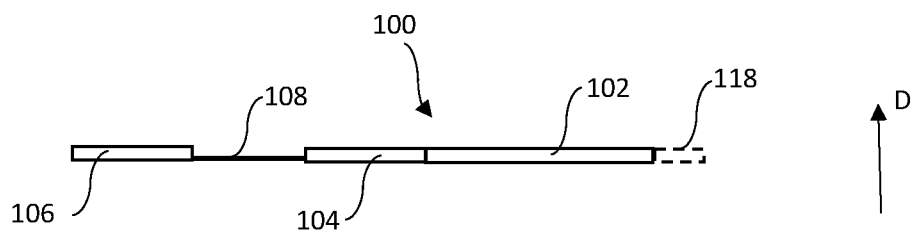
FIG. 3A schematically shows a side view of a rest mat according to an example.
Figure 3B:
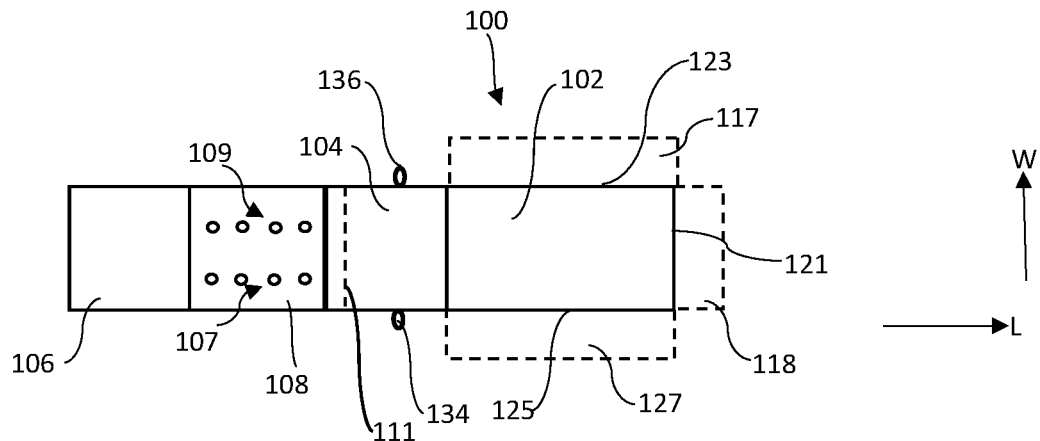
FIG. 3B schematically shows a plan view of a rest mat according to an example.

Some example dimensions of the mat will now be described with respect to FIGS. 3A and 3B. In the foregoing, "length" refers to a measurement along axis L in FIG. 3B, "width" refers to a measurement along axis W in FIG. 3B, and "depth" refers to a measurement along axis D in FIG. 3A.

According to some examples, excluding flaps 117 and 127, when deployed the mat 100 may have a width of around 40 cm. In some examples, this width is constant along the length of the mat 100. According to some examples, excluding flap 118, when deployed the mat may have an overall length in a range of about 100 cm to about 117 cm.

Looking at each portion in turn, in some examples, dimensions of the first matportion are about 44 cm in length by about 40 cm in width. In some examples, dimensions of the second mat portion 104 are about 23.5 cm in length by about 40 cm in width. According to some examples, dimensions of the third mat portion 106 are about 24 cm in length by about 30 cm in width. According to some examples, dimensions of the flap 118 are about 34 cm in length by about 40 cm in width. Of course, this is by way of example, and in other examples these dimensions may vary.

According to some examples, each of mat portions 102, 104, 106 has a depth of about 2 cm to about 4 cm.

According to some examples, the dimensions chosen are particularly well suited for positioning the mat 100 on a standard airline seat. It will of course be understood that other embodiments are envisaged where the dimensions may vary. For example, different versions may be available for different size airline seats. Versions are also envisaged where the mat 100 can span more than one seat. For example, a wider version of the mat may be made available which spans two seats.

Figure 4:
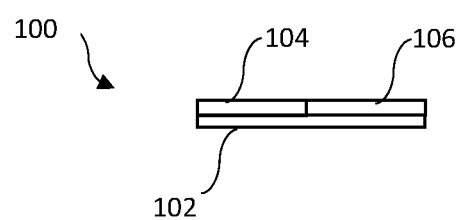
FIG. 4 schematically shows a side view of a sleep mat according to an example when in a folded configuration.

FIG. 4 shows the mat in its first mode or configuration, where the mat is configured for storage or transport. As shown, the mat 100 is folded so that the second mat portion 104 and the third mat portion 106 overlie the first mat portion 102. Straps and/or Velcro® or the like may be provided in order to hold the folded configuration together. In some examples, dimension of the mat portions 102, 104, 106 are chosen so that the first and second mat portion 104, 106 overlie the first mat portion 102 exactly or near exactly, so that there is no overhang. That is, in some examples, when the mat 100 is in its folded configuration the overall width and length is the same as the width and length of the first mat portion 102.

A further example embodiment will now be described with respect to FIGS. 5A to 8. It will be understood that features of the examples of FIGS. 1 to 4 can be combined with examples of FIGS. 5A to 8. In FIGS. 5A to 8, features that are equivalent to features of FIGS. 1 to 4 are allocated the same reference numeral, but one-hundred series higher (e.g., first mat portion 202 is equivalent to first mat portion 102, second mat portion 204 is equivalent to second mat portion 104, and soon).

Figure 5A:
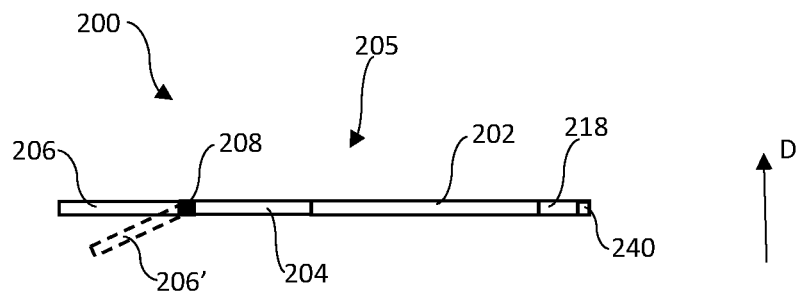
FIG. 5A schematically shows a side view of a rest mat according to an example.

As shown in FIG. 5A, mat 200 comprises a first mat portion 202, a second mat portion 204, and a third mat portion 206. An end flap 218 is also provided in this example. The mat 200 operates in a similar manner to mat 100, where the mat 200 has a first configuration for storage or transport, and a second configuration in which the mat 200 is deployed for use. For conciseness, all details of FIGS. 1 and 2 are not repeated. However, it will be understood that the first mat portion 202 is arranged to overlie or at least partially overlie a seat portion 114 of a chair 112 of a vehicle. The second mat portion 204 is arranged to project outwardly over a front edge 130 of the seat portion 114. The second mat portion 204 therefore forms an extended area 205 to accommodate a child. When the mat 200 is in its second configuration, the third mat portion 206 is arranged to attach to a seat-back pocket 116 (FIG. 1) or to a tray table (132) or part of a tray table 132 (FIG. 2). The flap 218 is arranged to secure the mat 200 to the chair 112. For example, in use, the flap 218 is arranged to be inserted between seat portion 114 and seat-back 120 of chair 112, i.e., into gap 119 shown in FIGS. 1 and 2.

Figure 5B:
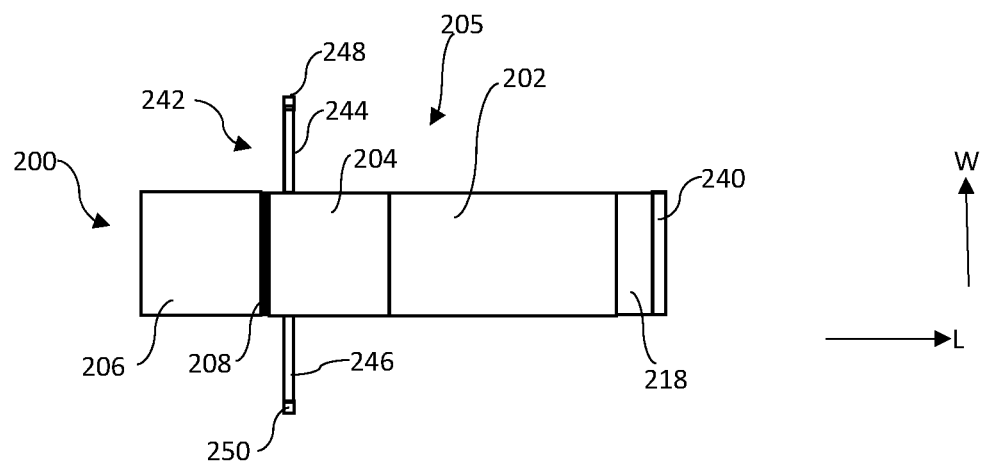
FIG. 5B schematically shows a plan view of a rest mat according to an example.
Figure 6:
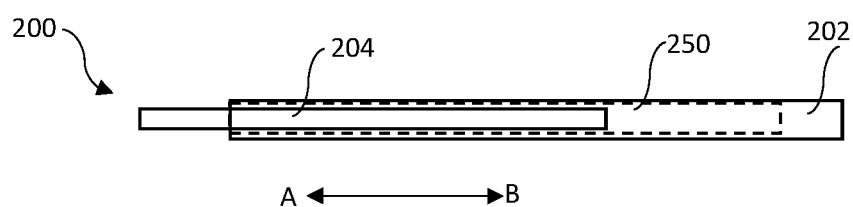
FIG. 6 schematically shows a side view of a rest mat according to an example.

According to some examples, the first mat portion 202 comprises a pocket portion shown schematically with dashed line at 250 (see FIG. 6 which is a side view of mat 200). The pocket portion 250 may alternatively be referred to as a hollow portion, or a slot, or a recess etc. In examples, the second mat portion 204 is arranged to slide in and out of pocket portion 250, as shown schematically by arrows A and B. Therefore, in some examples the first mat portion 202 has a depth (D in FIG. 5A) that is greater than a depth of the second mat portion 204. It will be noted that in FIG. 6 only the first mat portion 202 and second mat portion 204 are shown for the purpose of explaining pocket 250 and the sliding action between the first mat portion 202 and the second mat portion 204, but in practice other aspects of the mat 200 shown in FIGS. 5A and 5B will be present.

Being able to slide the second mat portion 204 in and out of first mat portion 202 (e.g., in the direction of arrows A and B in FIG. 6) enables an amount by which the second mat portion 204 projects from the first mat portion 202 to be adjusted. This can be useful to account for differing distances between chairs 110 and 112 (e.g., on different airlines). It can also be useful for adjusting the extended area 205 as desired.

According to some examples, the second mat portion 204 is able to slide completely out of the first mat portion 202. This separates the first mat portion 202 from the second mat portion 204. This feature may be useful, for example, to create a gap between chair 112 and chair 110 (see FIG. 1). This may be useful, for example, to let a passenger in to the aisle from a window seat or middle row seat, or to allow a passenger to return to those seats. This feature may also be useful, for example, if the mat 200 needs to be quickly de-constructed for any reason (for example seat-belt sign comes on and child needs to assume a sitting position).

Referring back to FIG. 5A, in some examples the mat 200 comprises two or more third portions. In the example of FIG. 5A, a first third portion 206 and a second third portion 206' are shown. In examples, each of the two or more third portions has a different length (L). Having two or more third portions 206, 206' of different length enables a user to select a most suitable third portion for a given circumstance (e.g., depth of seat back pocket, height of tray table etc.). According to some examples, each of the two or more mat portions 206, 206' are stacked above each other.

In the example of FIGS. 5A and 5B the connecting portion 208 comprises a narrow strip. For example, the connecting portion 208 may simply be a strip of material at the end of the second portion 204 or third portion 206. The connecting portion 208 may be considered a joint. In examples, the connecting portion 208 enables the third portion 206 to articulate (e.g., tilt up or tilt down) relative to the second portion 204.

According to some examples, the mat 200 comprises an attachment device 242. In examples, the attachment device is for attaching the mat 200 to the seat-back pocket 116 or tray table 132. In some examples, the attachment device is attached to the second mat portion 204. According to some examples, the attachment device 242 comprises a strap. According to some examples, the strap comprises an adjustable strap. In the example of FIG. 5B, the attachment device 242 comprises strap portions 244 and 246, which are connectable to each other and adjustable via one or more clasps or buckles shown schematically at 248 and 250. According to some examples, the attachment device 242 is arranged to form a carry-handle or carry-strap for carrying the mat 200 when the mat 200 is in its first configuration for storage or transport (see FIG. 8).

As shown in the example of FIG. 5B, the end-flap 218 comprises an elongate portion 240 which spans or substantially spans the width of the end flap 218. In examples, the end-flap 218 is arranged to be folded on itself around elongate portion 240. In some examples, the elongate portion 240 comprises a flat bar or the like. In some examples, the elongate portion 240 is rigid or semi-rigid. In some examples, the elongate portion 240 comprises a plastic material.

Figure 7:
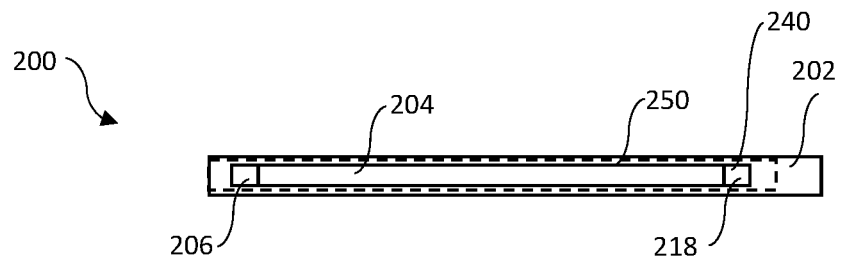
FIG. 7 schematically shows a side view of a rest mat according to an example.
Figure 8:
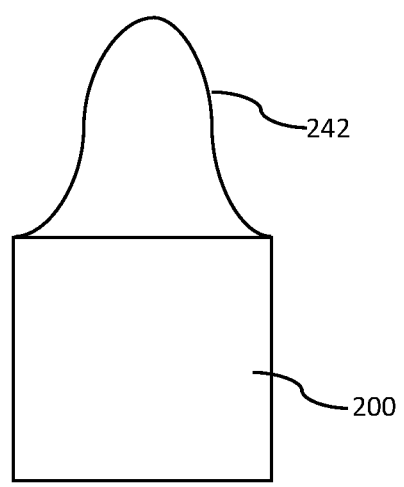
FIG. 8 schematic shows a view of a rest mat including a carry handle.

FIG. 7 is a side-view of the mat 200 when in its first configuration for storage or transport. As shown in FIG. 7, the second portion 204 is fully inserted in pocket 250 of first portion 202. The end flap 218 has been folded around elongate portion 240. Third portion 206 (or indeed third portions 206, 206') have been folded and also inserted into pocket 250. Thus, the overall dimensions of the mat 200, when in its first configuration, will be (or close to) the overall dimensions of first mat portion 202.

As previously mentioned, when the mat 200 is in its first configuration the attachment device 242 may act as a carry-strap or carry-handle. See FIG. 8.

According to some examples, one or more of the first, second and third mat portions 102, 202; 104, 204; 106, 206 comprise a deformable and resilient material that acts as a primary member in each portion. For example, one or more of the first, second and third portions 102, 202; 104, 204; 106, 206 may comprise a foam material.

According to some examples, one or more of the first, second and third portions 102, 202; 104, 204; 106, 206 comprise a durable, wipe-clean cover or coating. For example, the cover or coating may be waterproof and/or stain proof. For example, the cover or coating may comprise a tarpaulin material. In some examples, the cover or coating of each portion cannot be detached from its filling material (e.g., foam). In such cases the cover or coating is cleaned, for example, by wiping with a cloth, without removal from the filling. According to some other examples, the cover or coating may be removable, for example to enable cleaning of the cover or coating in a washing machine.

It will be appreciated that embodiments of the invention provide a child's restmat for use in a vehicle, such as an airplane. The mat 100, 200 is easy and convenient to transport. Once deployed in the vehicle, the mat 100, 200 is completely unobtrusive to staff or other passengers. For example, the mat 100, 200 does not project out into an aisle of the vehicle. By attaching to the tray-table 132 or seat pocket 116, a passenger sitting in the chair in front (e.g., chair 110) will not notice the presence of the mat 100, 200. For example, no connection to headrest of chair 110 is required, which would potentially be noticed by a passenger on chair 110. Therefore, in some examples it may be considered that the mat 100, 200 does not require, and nor is it arranged for, attachment to a headrest. Advantageously, by attaching the mat 100, 200 to seat-pocket 116 or tray table 132 (i.e., items that are lower down than the headrest), then potential movement of the mat 100, 200 is minimized if a passenger on chair 100 leans the chair backwards or forwards.

Moreover, the mat 100, 200 does not require attachment to an existing vehicle seatbelt or the like in order to function. Therefore, the mat 100, 200 does not use or compromise any existing vehicle restraint features. In use, the mat portion 106, 206 can quickly and easily be detached from the pocket 116 or tray-table 132, for example in case of an emergency or when the seat-belt light goes on.

In some examples, a carry-bag is provided for carrying the mat 100, 200. In some examples the carry bag can be used as a blanket for the child once the mat 100, 200 has been removed therefrom. In some examples the carry-bag has a fleecelining to provide a warm and comfortable blanket.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A rest mat for use in a vehicle, comprising:
    a first mat portion, a second mat portion, and a third mat portion;
    the mat having a first configuration in which the mat is configured for storage or transport, and a second configuration in which the mat is deployed for use; and
    the first mat portion, the second mat portion and the third mat portion arranged so that, when the mat is in its second configuration, the first mat portion is arranged to at least partially overlay a seat portion of a chair of the vehicle, the second mat portion is arranged to project outwardly over a front edge of the seat portion and form an extended area together with the first mat portion to accommodate a child, and the third mat portion is arranged to attach to a seat-back pocket or tray-table of a chair in front of the mat so as to provide support to the second mat portion;
    the first mat portion comprising a pocket portion, the second mat portion being arranged to slide in and out of the pocket portion.

2. The rest mat according to claim 1, the second mat portion being arranged to slide completely out of the first mat portion, so as to enable separation of the first mat portion from the second mat portion.

3. The rest mat according to claim 1, comprising a connecting portion between the second mat portion and the third mat portion, the connecting portion constructed and arranged to enable the third mat portion to articulate relative to the second mat portion.

4. The rest mat according to claim 3, the connecting portion constructed and arranged to enable the third mat portion to tilt downwardly or upwardly when the mat is in its second configuration.

5. The rest mat according to claim 1, wherein the mat comprises two or more third portions, each of the two or more third portions being of a different length.

6. The rest mat according to claim 5, wherein each of the two or more third portions are stacked above each other.

7. The rest mat according to claim 1, wherein the mat comprises an attachment device for attaching the mat to the seat-back pocket or tray table.

8. The rest mat according to claim 7, wherein the attachment device is attached to the second mat portion.

9. The rest mat according to claim 8, wherein the attachment device is arranged to form a carry-handle or carry-strap for carrying the mat when the mat is in its first configuration.

10. The rest mat according to claim 7, wherein the attachment device comprises an adjustable strap.

11. The rest mat according to claim 1, comprising an end flap that extends from the first mat portion in a direction opposite from the second mat portion, the end flap arranged to secure the mat to the chair.

12. The rest mat according to claim 11, wherein the end flap comprises an elongate portion that extends across a width of the end flap.

13. The rest mat according to claim 1, comprising one or more side flaps that extend from respective sides of the first mat portion, the one or more side flaps arranged to secure the mat to the chair.

14. The rest mat according to claim 1, wherein when in its second configuration an overall length of the rest mat is in a range of about 100 cm to about 117 cm.

15. The rest mat according to claim 1, a width of the mat being in a range of about 34.5 cm to about 40 cm.

16. The rest mat according to claim 1, dimensions of the first mat portion being about 44 cm in length by about 40 cm in width; dimensions of the second mat portion being about 23.5 cm in length by about 40 cm in width, dimensions of the third mat portion being about 24 cm in length by about 30 cm in width; dimensions of the end flap being about 34 cm in length by 40 cm in width.

17. The rest mat according to claim 1, one or more of the first mat portion, the second mat portion, and the third mat portion comprising a foam material.

18. The rest mat according to claim 1, wherein one or more of first mat portion, second mat portion, and third mat portion comprise a durable, wipe-clean cover or coating.

19. The rest mat according to claim 1, the vehicle comprising an airplane.

\* \* \* \* \*